US012766978B2

(12) United States Patent
Bagadi

(10) Patent No.: US 12,766,978 B2
(45) Date of Patent: Oct. 20, 2026

(54) LSTM NEURAL NETWORK BASED LONGITUDINAL VEHICLE SPEED PREDICTION FOR SLIP DETECTION

(71) Applicant: Canoo Technologies Inc., Torrance, CA (US)

(72) Inventor: Nandanshri Bagadi, Fort Worth, TX (US)

(73) Assignee: WHS ENERGY SOLUTIONS, LLC, Argyle, TX (US)

( * ) Notice: Subject to any disclaimer, the term of this patent is extended or adjusted under 35 U.S.C. 154(b) by 28 days.

(21) Appl. No.: 18/988,610

(22) Filed: Dec. 19, 2024

(65) Prior Publication Data

US 2026/0175702 A1 Jun. 25, 2026

(51) Int. Cl.
*B60L 15/20* (2006.01)

(52) U.S. Cl.
CPC ................................ *B60L 15/2036* (2013.01)

(58) Field of Classification Search
CPC .................................................. B60L 15/2036
See application file for complete search history.

(56) References Cited

U.S. PATENT DOCUMENTS

| | | | | |
|---|---|---|---|---|
| 11,371,602 | B1 * | 6/2022 | Bruns | F16H 59/46 |
| 2018/0005107 | A1 * | 1/2018 | Neil | G06F 15/82 |
| 2018/0231985 | A1 * | 8/2018 | Sun | B64U 20/87 |
| 2021/0171004 | A1 * | 6/2021 | Han | G06N 3/044 |
| 2022/0242441 | A1 * | 8/2022 | Thompson | B60W 60/001 |
| 2023/0399003 | A1 * | 12/2023 | Frey | B60W 50/12 |
| 2024/0378418 | A1 * | 11/2024 | Kang | G06N 3/0442 |

FOREIGN PATENT DOCUMENTS

| | | | | |
|---|---|---|---|---|
| EP | 4005883 A1 * | 6/2022 | | B60W 10/184 |
| JP | 2023039066 A * | 3/2023 | | |

OTHER PUBLICATIONS

Original and machine translation of JP 2023039066A (Year: 2023).*
Na, et al., "Short-term load forecasting algorithm based on LSTM-DBN considering the flexibility of electric vehicle," IOP Conference Series: Earth and Environmental Science, Principles of Chemistry and Materials Science, vol. 546, No. 042001, Aug. 11, 2020, 8 pages.

(Continued)

*Primary Examiner* — Frederick M Brushaber
(74) *Attorney, Agent, or Firm* — ALLEN, DYER, DOPPELT, GILCHRIST, P.A.

(57) ABSTRACT

A method includes receiving, by a processing device of a vehicle, a plurality of real-time measurements related to at least one current vehicle condition. The method also includes providing, by the processing device, the plurality of real-time measurements to a long short-term memory (LSTM) machine learning model. The method also includes predicting, by the processing device and using the LSTM machine learning model, a longitudinal speed of the vehicle based on the plurality of real-time measurements. The method also includes determining, by the processing device, a longitudinal slip ratio of each axle or of each wheel. The method also includes initiating, by the processing device based on the determination of the slip ratio, one or more vehicle actions to compensate for the slip ratio.

20 Claims, 12 Drawing Sheets

(56) References Cited

OTHER PUBLICATIONS

Malek, et al., "Multivariate Deep Learning Approach for Electric Vehicle Speed Forecasting," Big Data Mining and Analytics, vol. 4, Issue 1, Jan. 12, 2021, pp. 56-64.
Pulvirenti, et al., "Energy management system optimization based on an LSTM deep learning model using vehicle speed prediction," Transportation Engineering, vol. 11, No. 100160, Elsevier Ltd., Jan. 4, 2023, 16 pages.
Lu, et al., "GA-LSTM speed prediction-based DDQN energy management for extended-range vehicles," Energy and AI, vol. 17, Issue 4: 100367, Elsevier Ltd., Apr. 30, 2024, 18 pages.

* cited by examiner

LSTM NEURAL NETWORK BASED LONGITUDINAL VEHICLE SPEED PREDICTION FOR SLIP DETECTION

TECHNICAL FIELD

This disclosure relates generally to automotive vehicle systems. More specifically, this disclosure relates to long short-term memory neural network based longitudinal vehicle speed prediction for slip detection.

BACKGROUND

Current vehicle integration control implementations tend to underestimate or overestimate vehicle speed from the "true" vehicle speed which also leads to inaccurate estimation of odometer values and functioning of traction controls. Changes in tire radius also affects the accuracy of the estimation significantly, leading to improper controls that are downstream of speed estimation. These current implementations do not effectively adapt to changing traction surfaces where the speed is overestimated when one or more wheels of the vehicle slip excessively or lock-up under braking conditions, such as in cases of heavy rain, snow, gravel, etc. These inaccuracies lead to inefficient torque and brake control which are necessary for safe and efficient operation of the vehicle.

SUMMARY

This disclosure relates to long short-term memory neural network based longitudinal vehicle speed prediction for slip detection.

In one example, a method includes receiving, by a processing device of a vehicle, a plurality of real-time measurements related to at least one current vehicle condition. The method also includes providing, by the processing device, the plurality of real-time measurements to a long short-term memory (LSTM) machine learning model. The method also includes predicting, by the processing device and using the LSTM machine learning model, a longitudinal speed of the vehicle based on the plurality of real-time measurements. The method also includes determining, by the processing device, a longitudinal slip ratio of each axle or of each wheel based on the predicted longitudinal speed. The method also includes initiating, by the processing device based on the determination of the slip ratio, one or more vehicle actions to compensate for the slip ratio.

In one or more of the above examples, the plurality of real-time measurements includes one or more of a torque measurement of at least one motor of the vehicle, a longitudinal acceleration of the vehicle, a front axle speed of a front axle of the vehicle, or a rear axle speed of a rear axle of the vehicle or determined using wheel speeds of the respective axels.

In one or more of the above examples, the longitudinal slip ratio is determined for each axle based on the predicted longitudinal speed of the vehicle provided by the LSTM machine learning model, the front axle speed, and the rear axle speed.

In one or more of the above examples, the front axle speed and the rear axle speed are determined as 0.5× a sum of front wheel speeds and rear wheel speeds, respectively.

In one or more of the above examples, the LSTM machine learning model includes at least one LSTM cell.

In one or more of the above examples, the at least one LSTM cell includes a forget gate, an input gate, an update gate, and an output gate, wherein the update gate linearly creates new cell candidate values via a linear activation function.

In one or more of the above examples, the method further includes updating, by the processing device, a cell state of the LSTM cell using the new cell candidate values, linearly outputting, by the processing device, the updated cell state via another linear activation function, and combining, via a sigmoid function, the output updated cell state with an output of the output gate.

In one or more of the above examples, the one or more vehicle actions includes a torque control action or a brake control action.

In one or more of the above examples, the LSTM machine learning model is trained using a linear regression loss function and based on ground truth vehicle speeds provided by a vehicle speed sensor to adjust various weights and biases of the LSTM machine learning model.

In one or more of the above examples, the LSTM machine learning model is further trained using training data related to a plurality of traction surfaces.

In another example, an electric vehicle includes one or more vehicle component sensors, a memory storing a long short-term memory (LSTM) machine learning model, and a processing device communicatively connected to the memory and the one or more vehicle component sensors. The processing device is configured to receive a plurality of real-time measurements related to at least one current vehicle condition. The processing device is also configured to provide the plurality of real-time measurements to the LSTM machine learning model. The processing device is also configured to predict, using the LSTM machine learning model, a longitudinal speed of the electric vehicle based on the plurality of real-time measurements. The processing device is also configured to determine a longitudinal slip ratio of each axle or of each wheel based on the predicted longitudinal speed. The processing device is also configured to initiate, based on the determination of the slip ratio, one or more vehicle actions to compensate for the slip ratio.

In one or more of the above examples, the plurality of real-time measurements includes one or more of a torque measurement of at least one motor of the electric vehicle, a longitudinal acceleration of the electric vehicle, a front axle speed of a front axle of the electric vehicle, or a rear axle speed of a rear axle of the electric vehicle.

In one or more of the above examples, the longitudinal slip ratio is determined for each axle based on the predicted longitudinal speed of the electric vehicle provided by the LSTM machine learning model, the front axle speed, and the rear axle speed.

In one or more of the above examples, the front axle speed and the rear axle speed are determined as 0.5× a sum of front wheel speeds and rear wheel speeds, respectively.

In one or more of the above examples, the LSTM machine learning model includes at least one LSTM cell.

In one or more of the above examples, the at least one LSTM cell includes a forget gate, an input gate, an update gate, and an output gate, wherein the update gate linearly creates new cell candidate values via a linear activation function.

In one or more of the above examples, the processing device is further configured to update a cell state of the LSTM cell using the new cell candidate values, linearly output the updated cell state via another linear activation function, combine, via a sigmoid function, the output updated cell state with an output of the output gate.

In one or more of the above examples, the one or more vehicle actions includes a torque control action or a brake control action.

In one or more of the above examples, the LSTM machine learning model is trained using a linear regression loss function and based on ground truth vehicle speeds provided by a vehicle speed sensor to adjust various weights and biases of the LSTM machine learning model.

In one or more of the above examples, the LSTM machine learning model is further trained using training data related to a plurality of traction surfaces.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
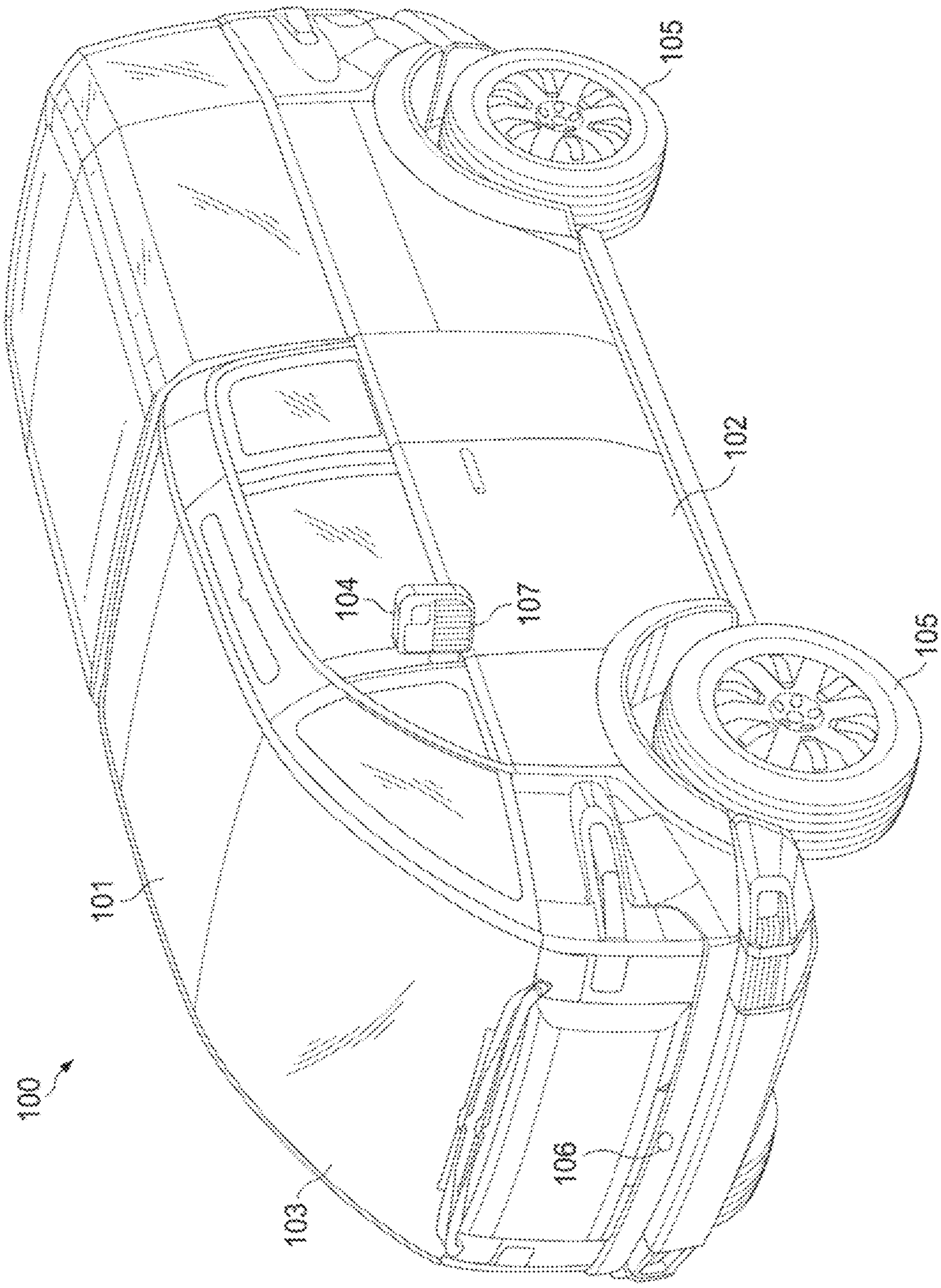
FIG. 1 is a perspective view of a vehicle with which long short-term memory (LSTM) neural network based longitudinal vehicle speed prediction for slip detection is implemented in accordance with this disclosure.

FIGS. 1 through 8, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, current vehicle integration control implementations tend to underestimate or overestimate vehicle speed from the 'true' vehicle speed which also leads to inaccurate estimation of odometer values and functioning of traction controls. Changes in tire radius also affects the accuracy of the estimation significantly, leading to improper controls that are downstream of speed estimation. These current implementations do not effectively adapt to changing traction surfaces where the speed is overestimated when one or more wheels of the vehicle slip excessively or lock-up under braking conditions, such as in cases of heavy rain, snow, gravel, etc. These inaccuracies lead to inefficient torque and brake control which are necessary for safe and efficient operation of vehicle.

This disclosure provides for long short-term memory neural network based longitudinal vehicle speed prediction for slip detection. Embodiments of this disclosure implement a machine learning method, a long short-term memory (LSTM) model to address and alleviate the issues described above. Various embodiments of this disclosure use an all-round training dataset for different traction surfaces and tire radiuses, which allows the LSTM to adapt and learn the relationships between system inputs, and allows the LSTM to output highly accurate results, such as results with an R2 performance score (accuracy) of 99.997% and root mean squared error (RMSE) of 0.178 only, while only increasing CPU load for the vehicle controller slightly, such as by an average increase of less than 1%. The embodiments of this disclosure also eliminate needing to use expensive devices like global positioning system (GPS) devices for similar estimation accuracy which are used to implement extensive methods that require a large amount of tuning, effort, and testing.

Use of the LSTM model as described in this disclosure allows for forecasting the control data, as the LSTM can remember/forget past and current data to accurately predict the future outcome. The present disclosure uses different inputs and measurement devices than previous LSTM approaches, and, as such this disclosure provides for reduced CPU load (computationally less extensive) and reduced cost for the vehicle than previous approaches. Some previous approaches also tend to predict incorrect values in off-nominal conditions such as snow, rain, etc. Along with providing more accurate vehicle speed values, this disclosure also has positive implications on downstream controls such as slip control, traction control, brake control, torque vectoring, etc., depending on the vehicle configuration, which improves vehicle stability and performance.

FIG. 1 is a perspective view of a vehicle 100 with which long short-term memory neural network based longitudinal vehicle speed prediction for slip detection is implemented in accordance with this disclosure. The embodiment of the vehicle 100 illustrated in FIG. 1 is for illustration and explanation only. FIG. 1 does not limit the scope of this disclosure to any particular implementation of a vehicle.

The vehicle 100 of FIG. 1 includes a chassis (not visible in FIG. 1) supporting a cabin 101 for carrying passengers. In some embodiments, the vehicle 100 is an electric vehicle (EV) in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle. In other embodiments, the vehicle 100 is a combustion engine vehicle.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an automated driving (AD) mode) to see outside the cabin 101. Rear view mirrors 104 mounted to sides of the cabin 101 enable the operator to see objects to the sides and rear of the cabin 101 and may include warning indicators (e.g., selectively illuminated warning lights) for advanced driver-assistance system (ADAS) features, such as blind spot warning (indicating that another vehicle is in the operator's blind spot) and/or lane departure warning features. Side cameras 107 may also be included on or near the rear view mirrors 104. At least one front camera 106 may also be included.

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not shown). Although not shown in FIG. 1, wheel speed sensors can be installed at or near the wheels, and axle speed sensors can also be installed at or near the axles of the vehicle. Automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1, and the long short-term memory neural network based longitudinal vehicle speed prediction described in this disclosure may be used with any other suitable vehicle.

Figure 2:
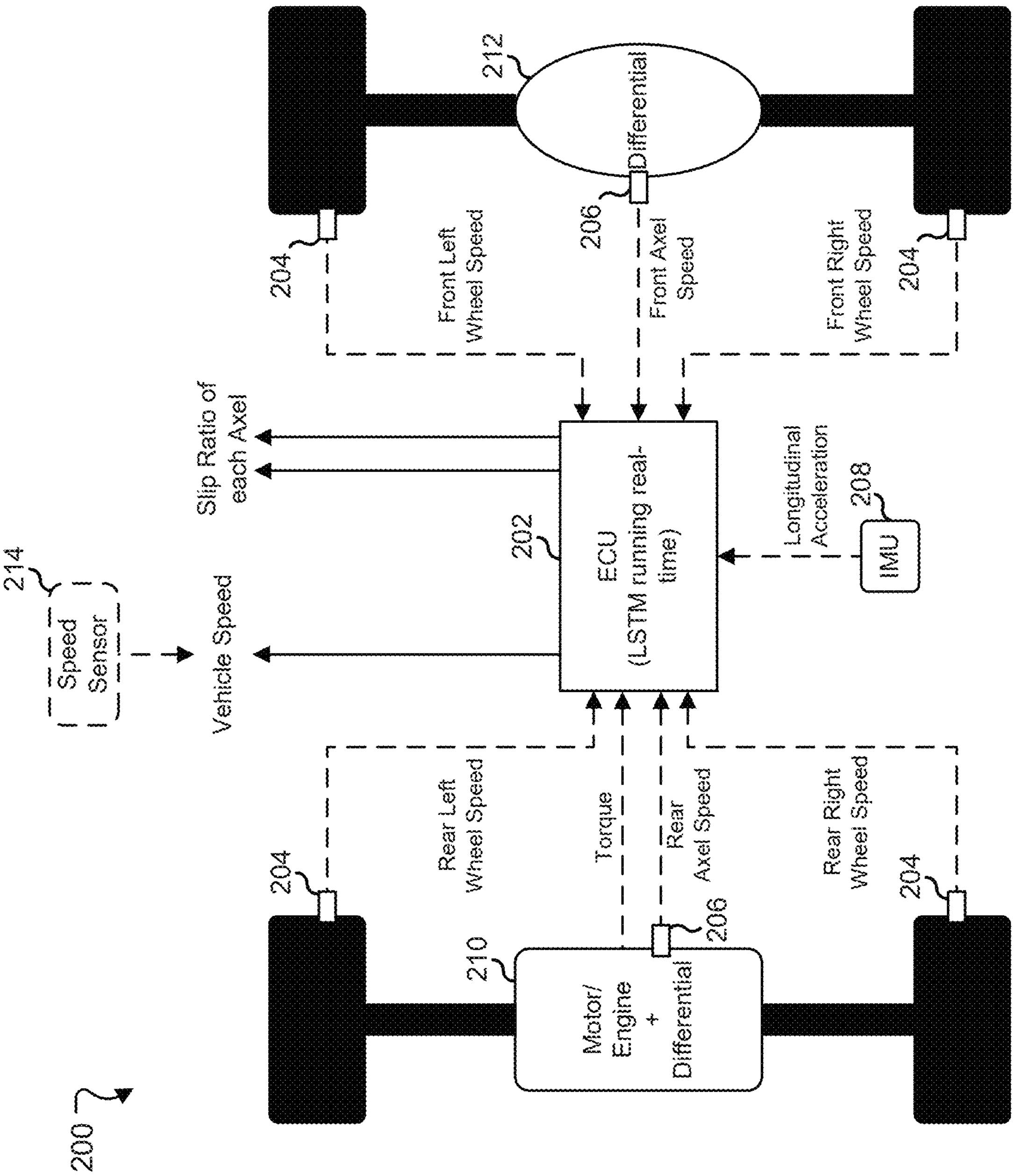
FIG. 2 illustrates an example EV architecture for a vehicle with which long short-term memory neural network based longitudinal vehicle speed prediction for slip detection can be implemented in accordance with this disclosure.

FIG. 2 illustrates an example EV architecture 200 for a vehicle with which long short-term memory neural network based longitudinal vehicle speed prediction for slip detection can be implemented in accordance with this disclosure. The example EV architecture 200 illustrated in FIG. 2 is for illustration and explanation only. FIG. 2 does not limit the scope of this disclosure to any particular implementation of an electric vehicle architecture.

Various communications connections are shown between an electronic control unit (ECU) 202 of the vehicle and other vehicle components, such as wheel speed sensors 204, axle speed sensors 206, and an inertial measurement unit (IMU) 208. The ECU 202 can include, be a part of, or be connected to a processor of the vehicle, such as a vehicle control unit (VCU). As shown in FIG. 2, the architecture 200 includes a motor 210 with a differential at the rear axle and a differential 212 at the front axle, although it will be understood that a motor could be installed at both axles. It will also be understood that other vehicle components, such as high voltage battery components, could also be included in the architecture 200.

The various sensors provide various data to the ECU 202. For example, the wheel speed sensors 204 can provide the wheel speed for each individual wheel, i.e., the rear left wheel speed, the rear right wheel speed, the front left wheel speed, and the front right wheel speed, as shown in FIG. 2. Each axle speed sensor 206 can also provide rear axle speeds for the respective axle to the ECU 202, and the torque of the motor 210 can also be measured and provided to the ECU 202. For example, the wheel speed sensors 206 can be used by the ECU 202 to determine the axle speed, where the axle speed can be expressed as follows.

$$\text{Axel speed} = \frac{\text{Left wheel speed} - \text{Right wheel speed}}{2}$$

In some embodiments, the above calculated speed using individual wheel speeds can be used, or, in some embodiments, each measured axle speed from the axle speed sensors 206 can be used. In various embodiments, the torque can be measured from the motor 210 or can determined using a mathematical estimation.

The IMU 208 can provide longitudinal acceleration measurements (+/−) to the ECU 202. Based on the measurements provided to the ECU 202, the ECU 202, executing the LSTM, can determine and output information on vehicle speed and the longitudinal slip ratio of each axle. The measurements are used as inputs to the LSTM neural network for training and later, once trained, to predict vehicle speed. As shown in FIG. 2, a dedicated speed sensor device 214, such as a VBOX device, or a similar device, can also be included in the architecture 200 and used during training of the LSTM to collect and provide to the ECU 202 "true" vehicle speeds (e.g., to be used as ground truth speeds), along with the above-described sensor data.

The longitudinal slip ratio per axle can be determined based on the predicted vehicle speed, where calculation of the slip ratio can be expressed as follows.

$$\text{Longitudinal slip ratio (\%)} = \frac{\text{Predicted vehicle speed} - \text{Axel speed}}{\text{Predicted vehicle Speed}} \times 100$$

In various embodiments, longitudinal wheel slip can also be calculated, where each wheel speed is used in the above equation instead of axle speed.

It will be understood that one or more of the vehicle components 204-214 can utilize further electronic control units (ECUs) to interconnect with the ECU 202 that executes the LSTM. That is, each of the components 204, 206, 208, 210, 212, and 214 of the EV architecture 200 can be communicatively connected to the ECU 202 via at least one communication interface. The various communication connections between the components can be wireless or wired. For example, components 204, 206, 208, 210, 212, and 214 of the EV architecture 200 can be communicatively interconnected with the ECU 202 on a CAN via the so-called CAN bus. The various ECU's can be interconnected via a network such as the CAN bus to provide information to other components, and their respective ECUs, on the network.

Each ECU can include a printed circuit board (PCB) with a processor or microcontroller integrated circuit coupled to various input sensors, switches, relays, and other output devices. The standard for the CAN bus was released around 1993 by the International Organization for Standardization (ISO) as ISO 11898. The current version of that standard is ISO 11898-1:2015, and the CAN busses described herein may comply with that standard in some embodiments. In various embodiments, the CAN design permits the components of the EV architecture 200 to communicate with each other without the need for a centralized host. Instead, communication can take place on a peer-to-peer basis. The CAN design therefore permits data from vehicle components such as those shown in FIG. 2 to circulate between components, allowing each component to transmit data on the CAN bus while simultaneously listening to the CAN bus to pull out data needed to complete tasks.

Although FIG. 2 illustrates an example of an EV architecture 200, those skilled in the art will recognize that the full structure and operation of suitable vehicle systems and architectures are not depicted in the drawings or described here. Instead, for simplicity and clarity, only the structure and operation necessary for an understanding the present disclosure is depicted and described. Various changes may be made to the example shown in FIG. 2, and LSTM neural network based longitudinal vehicle speed prediction for slip detection described in this disclosure may be used with any other suitable systems and architectures.

Figure 3A:
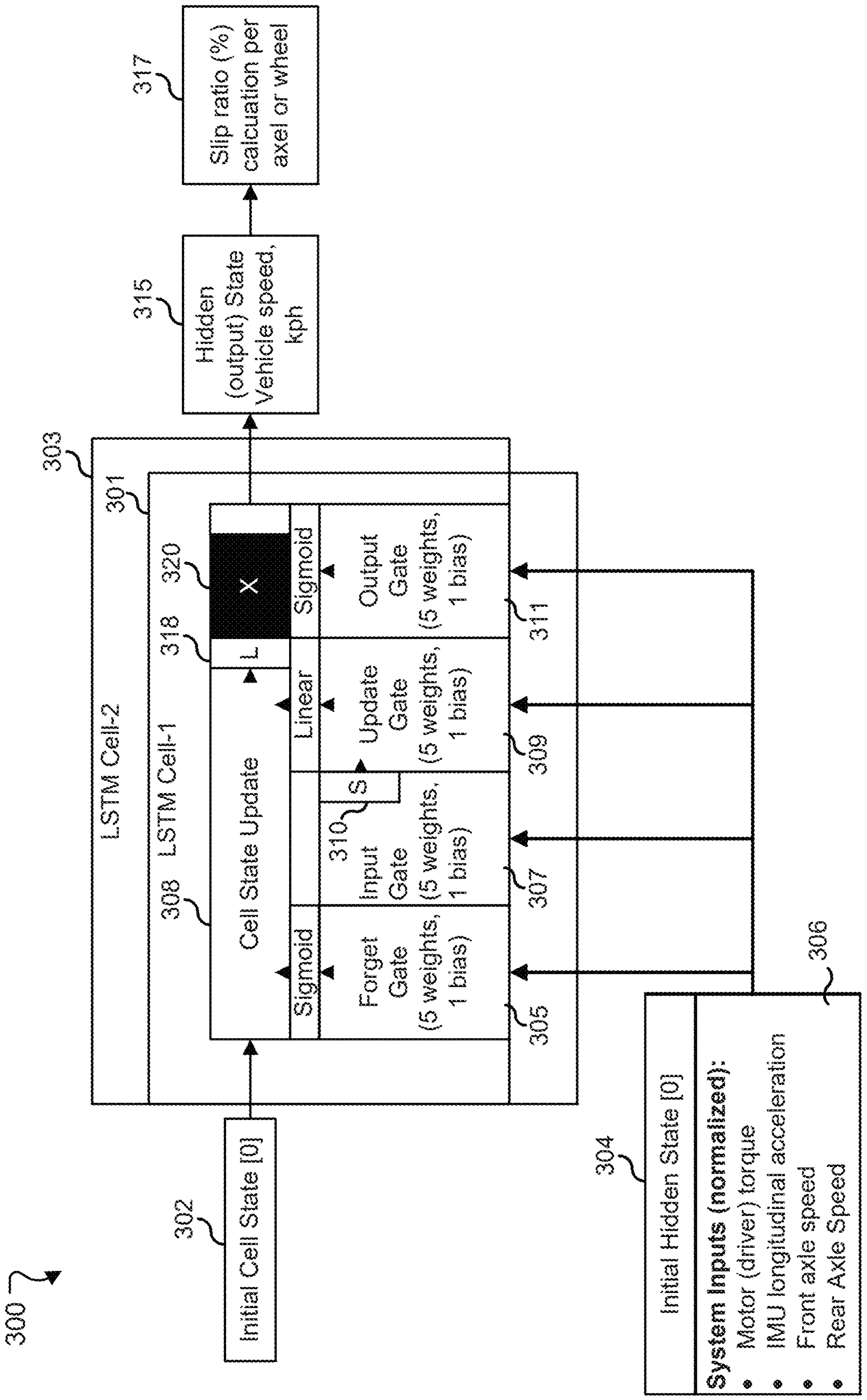
FIG. 3A illustrates a LSTM network architecture in accordance with this disclosure.
Figure 3B:
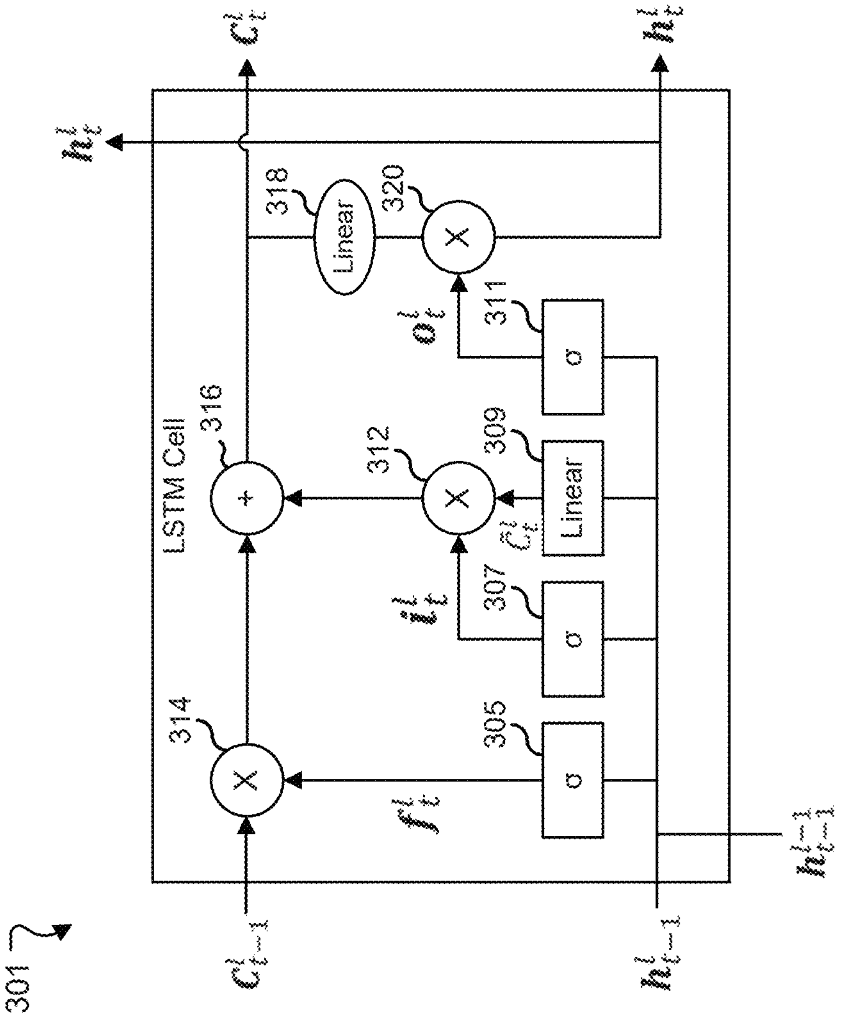
FIG. 3B illustrates an LSTM cell of the LSTM network architecture of FIG. 3A in accordance with this disclosure.

FIG. 3A illustrates a LSTM network architecture 300 in accordance with this disclosure, and FIG. 3B illustrates an LSTM cell 301 of the LSTM network architecture 300 in accordance with this disclosure. The LSTM network architecture 300 can be used with the EV architecture 200, as described above. The LSTM network architecture 300 and the LSTM cell 301 illustrated in FIGS. 3A and 3B are for illustration and explanation only. FIGS. 3A and 3B does not limit the scope of this disclosure to any particular implementation of an LSTM architecture.

As shown in FIG. 3A, the LSTM network architecture 300 includes the LSTM cell 301. The LSTM network architecture 300 can use any number of LSTM cells, such as a second LSTM cell 303 as illustrated in FIG. 3A. Each cell of the LSTM network architecture 300 can have a similar structure, but each cell receives a previous cell state (or an initial cell state 302 in the case of the first LSTM cell 301 of the LSTM network architecture 300). The LSTM cells also receive an initial hidden state 304, and various data inputs 306, which can be normalized for more efficient processing. These data inputs 306 can correspond to the various data measured, collected, and/or, calculated using the various sensors described with respect to the EV architecture 200 of FIG. 2, such as motor/engine (or driver) torque, longitudinal acceleration from an IMU, front axle speed, and rear axle speed. In some embodiments, lateral speed can also be included as an input.

LSTM networks are useful in forecasting data as the LSTM network can remember or forget past and current data to accurately predict the future outcome. While LSTM networks have been previously used, previous approaches used more, and a different set of, inputs and measurement devices that in turn increase CPU load (and are thus computationally extensive) and increase manufacturing costs to the vehicle. Further, previous approaches tend to predict incorrect values in off-nominal conditions such as snow, rain, etc.

Use of the LSTM architecture 300 is advantageous because the LSTM cell 301, as well as subsequent cells, includes neural networks that act as various gates in order to determine which data is important to consider in determining the output. The LSTM architecture 300 allows for long term context to be retained between cells, where each cells has, instead of one neural network, four neural networks structured as a forget gate 305, an input gate 307, an update gate 309, and an output gate 311. In various embodiments, the set of inputs 306 essentially define the LSTM's I/O architecture. For example, based on the inputs 306, each of the forget gate 305, the input gate 307, the update gate 309, and the output gate 311 include neural networks having 5 weights and 1 bias, in this example. In various embodiments, the weight and biases can vary based on training datasets with environmental parameters like driving on asphalt, rain, snow, etc. As shown in FIGS. 3A and 3B, the LSTM cell 301 takes the initial cell state 302, and updates the cell state 302 at a cell state update operation 308. The gates 305-311 take the inputs of the initial/previous hidden state 304, as well as the data inputs 306, and determines based on this data how to update the cell state 302 at the cell state update operation 308.

For example, the forget gate 305 is configured to determined which information from the cell state 302 should be discarded or "forgotten," which is accomplished by using a sigmoid function to output to the cell state update operation 308 a number between 0 and 1 (1 representing to absolutely keep the data and 0 representing to absolutely get rid of the data) for each number in the input cell state 302

$$(C^{l}_{t-1}$$

in FIG. 3B). The output of the forget gate 305 is shown in FIG. 3B as $$f_t^{l},$$

and can be expressed as follows.

$$\text{Forgot Gate, } f_t = \sigma(w_f[h_{t-1}, x_t] + b_f)$$

Then, the input gate 307 and the update gate 309 are used to determine what new information should be stored in the cell state via the cell state update operation 308. The input gate 307 includes a sigmoid function 310 that is used to determine which values should be updated using the previous hidden state 304

$$(h^{l}_{t-1}$$

in FIG. 3B) and the inputs/vehicle measurements of the data inputs 306

$$(h^{l-1}_{t-1}$$

in FIG. 3B) to provide a set of outputs $$(i_l^{t}$$

in FIG. 3B), which can be expressed as follows.

$$\text{Input Gate, } i_t = \sigma(w_i[h_{t-1}, x_t] + b_i)$$

The update gate 309 then uses a linear function to provide a vector of new candidate values $$(\tilde{C}^{l}_{t}$$

in FIG. 3B) to be used in updating the values of the cell state, which can be expressed as follows.

$$\text{Cell (candidate) state, } \tilde{c}_t = \text{linear}(w_c[h_{t-1}, x_t] + b_c)$$

The output $$(\tilde{C}_t^l)$$

of the update gate 309 is then combined with the output $$(i_l^t)$$

of the input gate 307 via a multiplication operation 312.

To update the cell state, the cell state update operation 308 includes, as shown in FIG. 3B, a multiplication operation 314 that multiplies the output of the forget gate 305

$$(f_t^l)$$

and the initial cell state 302

$$(C_{t-1}^l).$$

The output of the multiplication operation 312 is then combined with the output of the multiplication operation 312

$$(i_l^t * \tilde{C}_t^l)$$

via an addition operation 316. This provides the new candidate values, scaled by how much it was determined to update each state value. For example, old data regarding vehicle measurements can be dropped by the forget gate 305, and the state of the cell 301 is updated by removing this information, and then updating the cell state using the new data inputs provided to the cell 301.

Then, it is further determined what the final output 315 (hidden output including vehicle speed (longitudinal speed) in a metric such as kph or mph) should be using the output gate 311, to create a filtered version of the new cell state output by the cell state update operation 308. As shown in FIG. 3B, the forget gate 305, the input gate 307, the update gate 309, and the output gate 311 are illustrated as represented by their corresponding functions, e.g., sigmoid function, sigmoid function, linear function, and sigmoid function, respectively. As shown in FIGS. 3A and 3B, the output gate 311 uses another sigmoid function to determine what parts of the cell state to output, which can be expressed as follows.

$$\text{Output Gate, } o_t = \sigma(w_o[h_{t-1}x_t] + b_o)$$

Then, the cell state is combined linearly with the output(s)

$$(o_t^l)$$

of the output gate 311 via linear function 318 and multiplication operation 320 to provide the final output 315

$$(h_t^l$$

in FIG. 3B), which can be expressed as follows.

$$\text{Hidden (output) state, } h_t = o_t * \text{linear } (c_t)$$

In the above equations, $w_{i,f,o,c}$ & $b_{i,f,o,c}$ are the weights and biases of the input gate, forget gate, output gate, and cell state, respectively. σ is the sigmoid activation function, $h_{t-1}$ is the previous (or initial) hidden state, and $c_{t-1}$ is the previous (or initial) cell state. The final output 315 (vehicle speed) can then be used as described in this disclosure to determine longitudinal slip ratio of the vehicle axles or of the wheels.

As shown in FIG. 3B, if further cells are to be used, the new cell state $$(C_t^l)$$

and the output hidden state $$(h_l^t)$$

can both be provided to a next cell state, which would operate as described above to use the output hidden state and new measured inputs to determine what information to forget/retain from the output hidden state, and to again update the new cell state. In various embodiments, the number of LSTM cells/layers can be (but is not limited to) 1 cell. This is because, for real-time implementations, the inventors of this disclosure have found that fewer cells (and even 1 cell) can provide better results, as using 1 cell (e.g., invoking a new/initialized version of the LSTM architecture 300 for the inputs at each time t) can still provide accurate outputs, without using multiple cells that increases memory and CPU load/throughput. However, it will be understood that more cells could be used if needed or desired, and given enough memory and CPU processing resources. Also, while previous implementations of LSTM networks use tanh functions where the linear functions 309, 318 are shown in FIGS. 3A and 3B, the use of linear (that is, no activation function) here improves the overall efficiency of the system be reducing computation resources used, which can be done because the input/output data is already normalized between −1 and 1, and thus use of a tanh function can be avoided. However, it is possible that a tanh function could be used in some situations, if needed or desired.

Although FIGS. 3A and 3B illustrate an example of an LSTM network architecture 300 and an LSTM cell 301, various changes may be made to FIGS. 3A and 3B. For example, various components and functions in FIGS. 3A and 3B may be combined, further subdivided, replicated, or rearranged according to particular needs. Also, one or more additional components and functions may be included if needed or desired. For instance, in some embodiments, additional filters such as low pass filter can be implemented on the sensor measurement and on the output of the LSTM model. In some embodiments, the set of inputs 306 can be a direct measurement from the sensors, or commanded values from a driver and the vehicle. In some embodiments, motor torque can be a mathematical result of deceleration torque from mechanical brakes, regeneration braking, and acceleration torque. In some embodiments, front and rear axle speeds can be a direct axle speed measurement, can be determined from wheel speeds, such as 0.5× the sum of front and rear wheel speeds, respectively, or can be determined from motor speed for the respective powered axle. The axle speeds can also be converted to longitudinal speed or used as rotational speed. It will be understood that the architecture 300 can be used with all-wheel drive (AWD), rear-wheel drive (RWD), front-wheel drive (FWD), and four-wheel drive (4WD) vehicles, etc., where the minimum and maximum limits of the input and output will vary for data normalization and de-normalization. The outputs provided using the LSTM model can be used for user reference and other vehicle control improvements such as brake, traction, and torque vectoring controls for better vehicle drive-ability and performance. The improved vehicle speed predictions provided by the LSTM model can also help with estimation of other crucial vehicle and external parameters such as wheel slip, vehicle mass, remaining range, odometer distance traveled, tire radius, road grade, etc.

Figure 4:
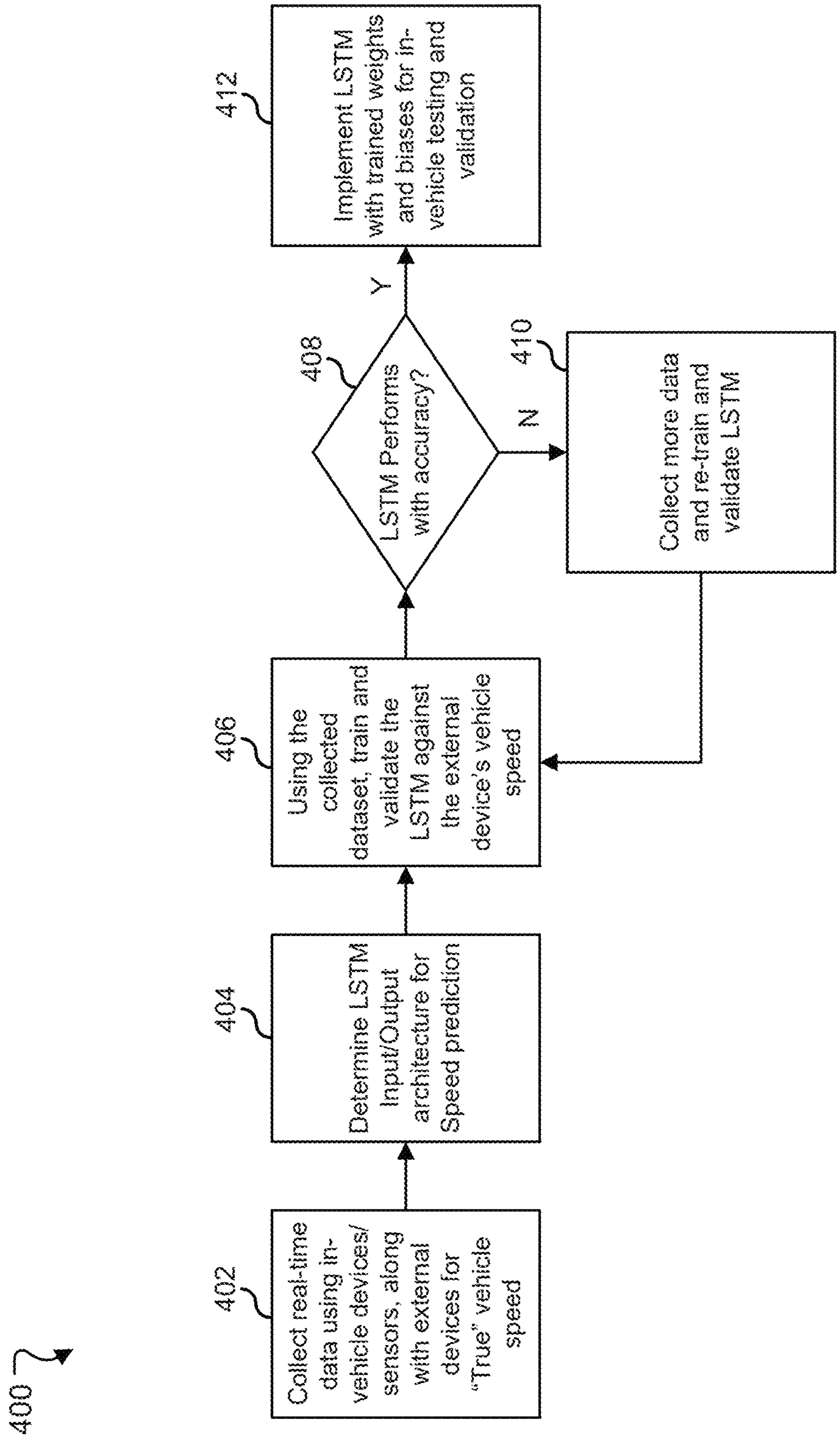
FIG. 4 illustrates an example method for training an LSTM network in accordance with this disclosure.

FIG. 4 illustrates an example method 400 for training an LSTM network in accordance with this disclosure. For ease of explanation, the method 400 shown in FIG. 4 is described as being performed using one or more of the vehicle 100, the architecture 200, and/or the architecture 300. In various embodiments, certain steps of the method 400 may be described as being performed by a processing device or processor, such as the ECU 202. However, the method 400 could be performed using any other suitable device(s) and in any other suitable system(s).

As shown in FIG. 4, at step 402, real-time data using in-vehicle devices/sensors is collected, e.g., using the sensors 204, 206 of this disclosure, along with data such as "true" vehicle speed from external devices, e.g., the speed sensors device 214 (such as a VBOX device) described in this disclosure.

At step 404, the LSTM input/output architecture for speed prediction is determined, such as based on the specific input data types to be used. At step 406, the LSTM is trained and validated, using the collected datasets, against the external device's (e.g., the speed sensors device 214) measured vehicle speed. In this way, it can be determined whether the predictions output by the LSTM model are the same as or similar to the "true" speed provided by the external device.

At step 408, it is determined based on the output of step 406, whether the LSTM is performing with accuracy. If not, at step 410, the additional data is collected and the LSTM is retrained and validated. The LSTM can be retrained using a loss function. For example, the outputs of the LSTM model produced using the training input data can be provided to a loss function. The loss function calculates the error or loss associated with the LSTM model's predictions. For example, when the outputs of the LSTM model differ from the ground truths (the "true" vehicle speed provided by the external device), the differences can be used to calculate a loss as defined by the loss function. The loss function may use any suitable measure of loss associated with outputs generated by the speaker verification model, such as a cross-entropy loss or a mean-squared error. For example, the loss function can be a linear regression loss function that provides a mean squared error (MSE), which can be expressed as follows.

$$MSE\text{ (Mean Squared Error)} = \left(\frac{1}{n}\right)\sum_{i=1}^{n}\left(y^{i}_{prediction} - y^{i}_{actual}\right)^2$$

Here, n is the number of datapoints, $$y^{i}_{prediction}$$

is the predicted value of the LSTM during training for i-th datapoint, and $$y^{i}_{actual}$$

is the actual or ground truth value that the LSTM is being trained for the i-th datapoint.

When the loss calculated by the loss function is larger than desired, the parameters (e.g., the weights) of the LSTM can be adjusted. Once adjusted, the method 400 can include performing steps 406-410 any number of times, to further adjust the parameters of the LSTM model, using the same or additional training data. Over time, the LSTM model produces more accurate outputs that more closely match the ground truths, and the measured loss becomes less. At some point, the measured loss can drop below a specified threshold, and, at step 408, it is determined the LSTM performs with accuracy. Then, at step 412, the LSTM is implemented with the trained weights and biases for in-vehicle use.

Although FIG. 4 illustrates one example of a method 400 for training an LSTM network, various changes may be made to FIG. 4. For example, while shown as a series of steps, various steps in FIG. 4 could overlap, occur in parallel, occur in a different order, or occur any number of times (including zero times). For instance, in various embodiments, during training, the LSTM model can be trained to perform better in various environmental scenarios, such as driving on various traction surfaces like asphalt, driving on snow, driving in the rain or wet roads, etc. This can include training the LSTM model using a first dataset related to asphalt conditions, a second dataset related to snow conditions, a third dataset related to rain conditions, and so on. The training can also include data related to various vehicle masses, driving aggression, tire radius, etc., so that the LSTM can account for these various factors in predicting vehicle speed.

FIGS. 5A-5D illustrate various examples of comparative results data using the LSTM model for longitudinal vehicle speed prediction of this disclosure. It will be understood that the examples of FIGS. 5A-5D are merely for illustrative purposes, and other results can be obtained using the various embodiments of this disclosure.

Figure 5A:
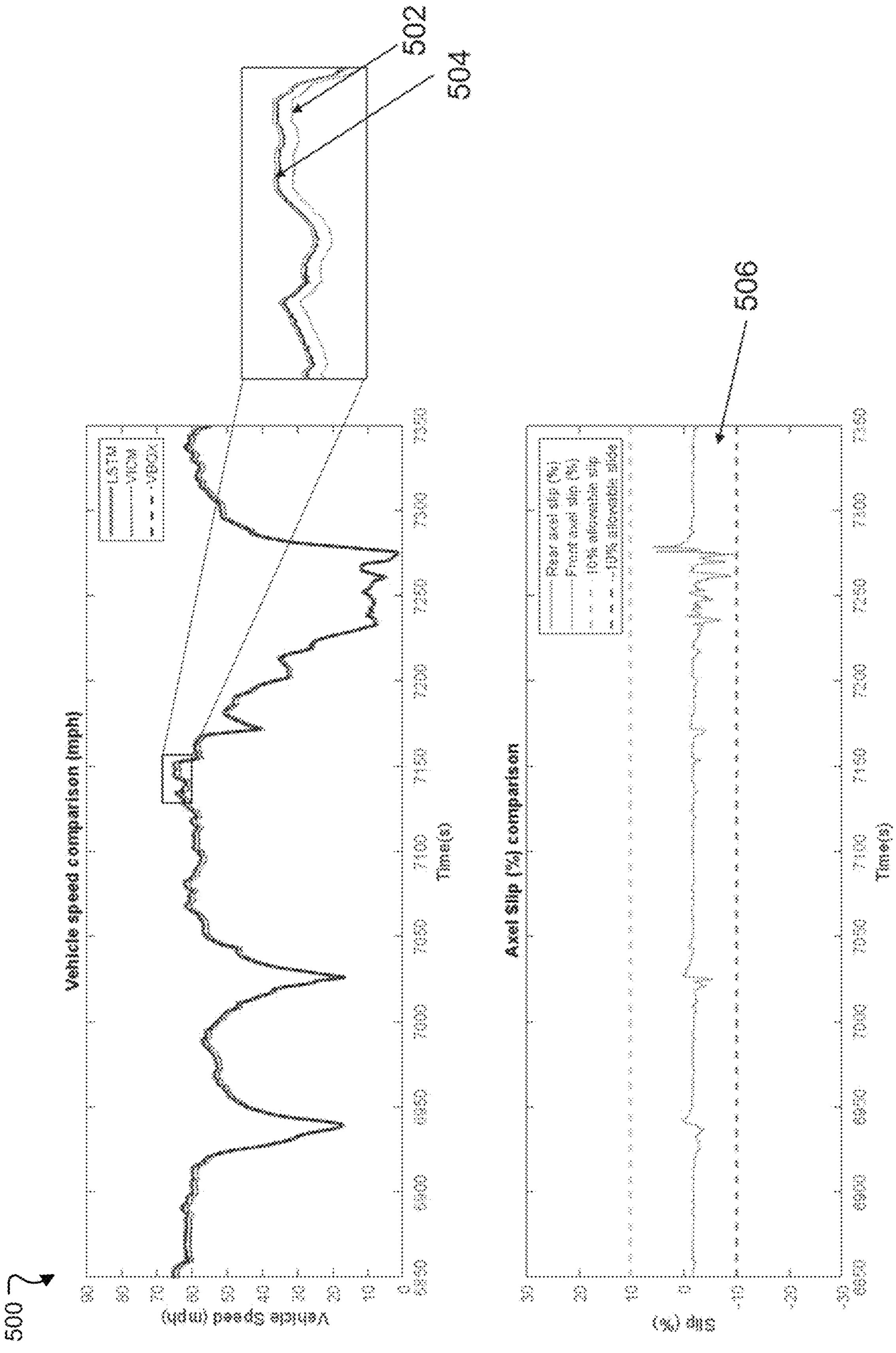
FIGS. 5A-5D illustrate various examples of comparative results data using the LSTM model long short-term memory neural network based longitudinal vehicle speed prediction of this disclosure.

FIG. 5A illustrates a results chart 500 measured for a real-wheel drive vehicle on asphalt, with the inputs and outputs being provided from real-time data. As described in this disclosure, the LSTM is trained on measured inputs and outputs, that is, the vehicle speed measured using a speed sensor such as a VBOX device or a similar device which is equipped with a GPS+IMU that provides for "true" vehicle speed. A line 502 shows vehicle speed predicted using a prior technique based on using a vehicle integration control module (VICM) and a Kalman filter, which, as shown, tends to underestimate the actual speed values. However, a line 504 represents the speed values obtained using the LSTM model based approach of this disclosure, which provides close to true vehicle speeds. Further, as shown by a line 506 in FIG. 5A, the rear and front axle wheel slip percentages obtained using the speed values shown by line 504 are within allowable slip limits.

Figure 5B:
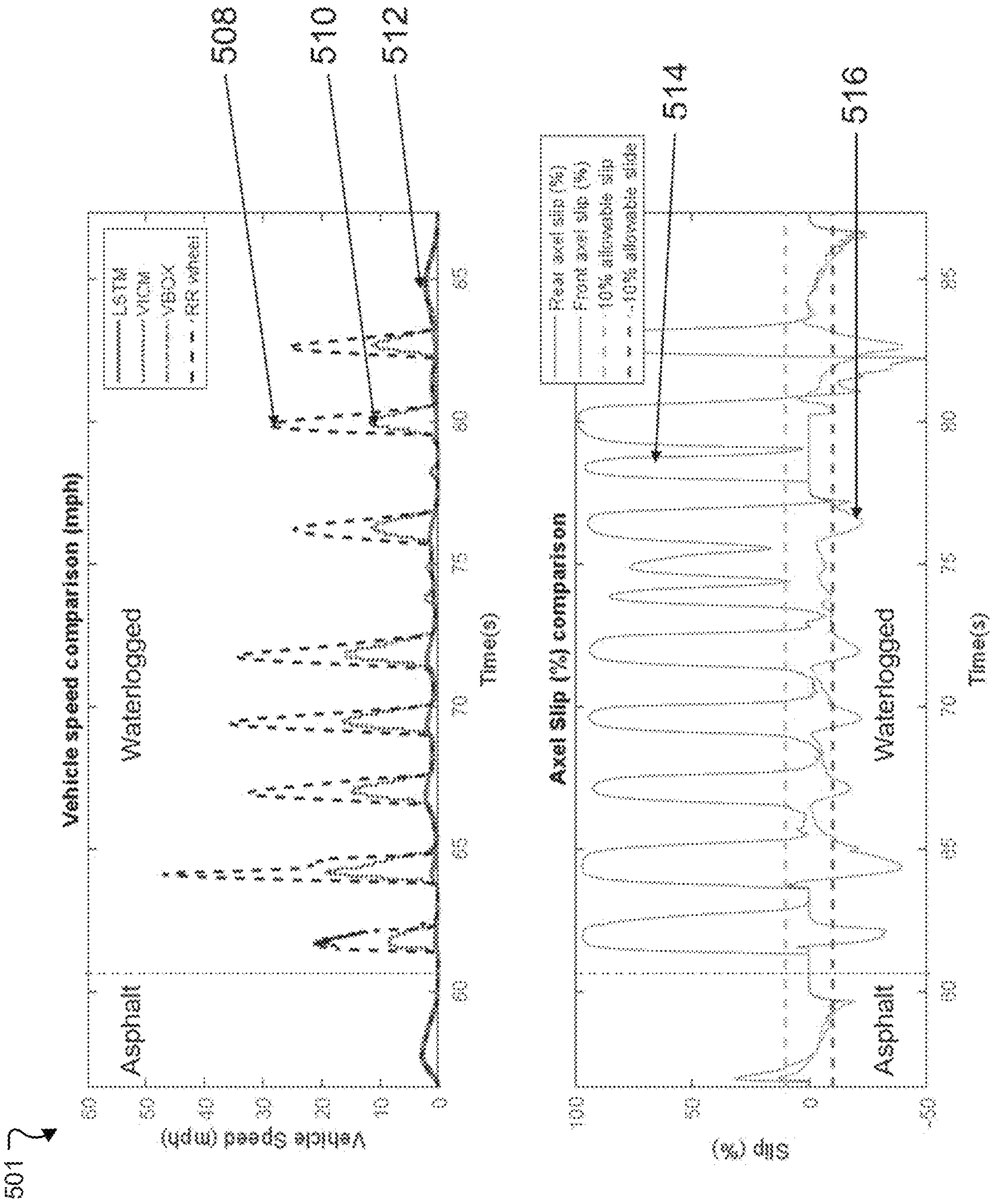

FIG. 5B illustrates a results chart 501 measured for a real-wheel drive vehicle experiencing low-traction environmental conditions, with the inputs and outputs being provided from real-time data. As described in this disclosure, the LSTM is trained on measured inputs and outputs, and, in some embodiments, the "true" speed can be intentionally changed slightly during training to achieve desired results from the LSTM model. Lines 508 show that, when in a waterlogged driving condition, the rear wheels are slipping, affecting the speed of the rear wheels. The chart 501 also includes a line 510 that indicates a previous speed prediction technique (based on VICM) is significantly overestimating the overall vehicle speed due to the slippage of the rear wheels, providing a result that does not correspond to the true vehicle speed. However, a line 512 represents the speed values obtained using the LSTM model based approach of this disclosure, which provides close to true vehicle speeds, and, in this example, is much more steady compared to the speeds shown by the line 510. Further, as shown by a line 514 in FIG. 5B, using the LSTM model outputs, it can be determined that the rear axle is detected as slipping (i.e., the rear wheel is overspinning) and, as shown by a line 516, a front axle slide is also detected, indicating that the front wheels are potentially losing traction and sliding along the road surface.

Figure 5C:
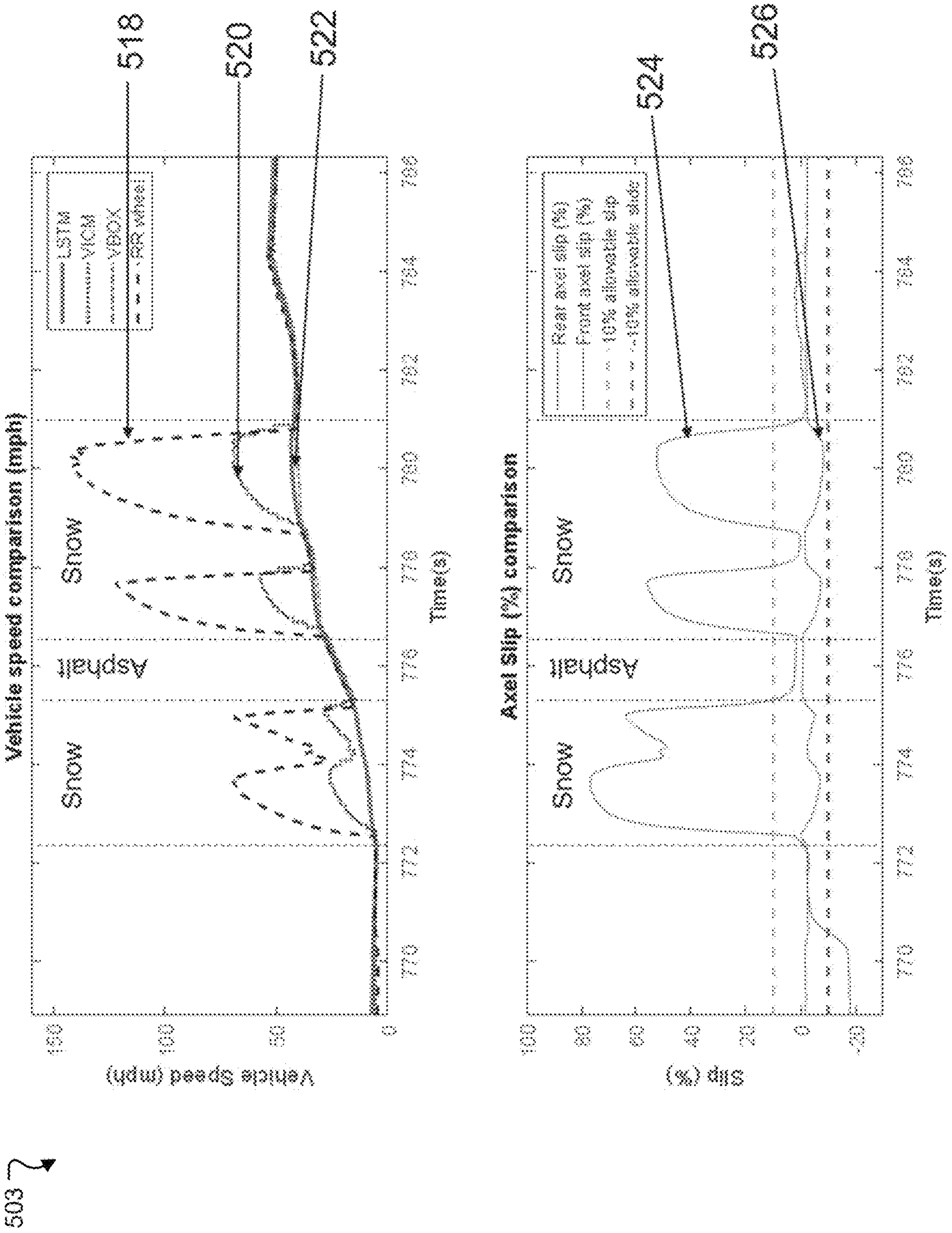

FIG. 5C illustrates a results chart 503 measured for a real-wheel drive vehicle in changing traction environmental conditions, with the inputs and outputs being provided from real-time data. As shown in FIG. 5C, the vehicle is experiencing changing driving conditions, going from snow conditions, to asphalt conditions, and back to snow conditions, etc. As described in this disclosure, the LSTM is trained on measured inputs and outputs, and, in some embodiments, the "true" speed can be intentionally changed slightly during training to achieve desired results from the LSTM model. A line 518 shows that, when driving in the snow conditions, the rear right wheel is slipping, which, as shown by a line 520, causes a previous speed prediction technique (based on VICM) to overestimate the overall vehicle speed. However, a line 522 represents the speed values obtained using the LSTM model based approach of this disclosure, which provides closer to true vehicle speeds. Further, as shown by a line 524 in FIG. 5C, using the LSTM model outputs, it can be determined that the rear axle is detected as slipping (i.e., the rear wheel is overspinning) and, as shown by a line 526, a front axle slide is also detected, indicating that the front wheels are potentially losing traction and sliding along the road surface.

Figure 5D:
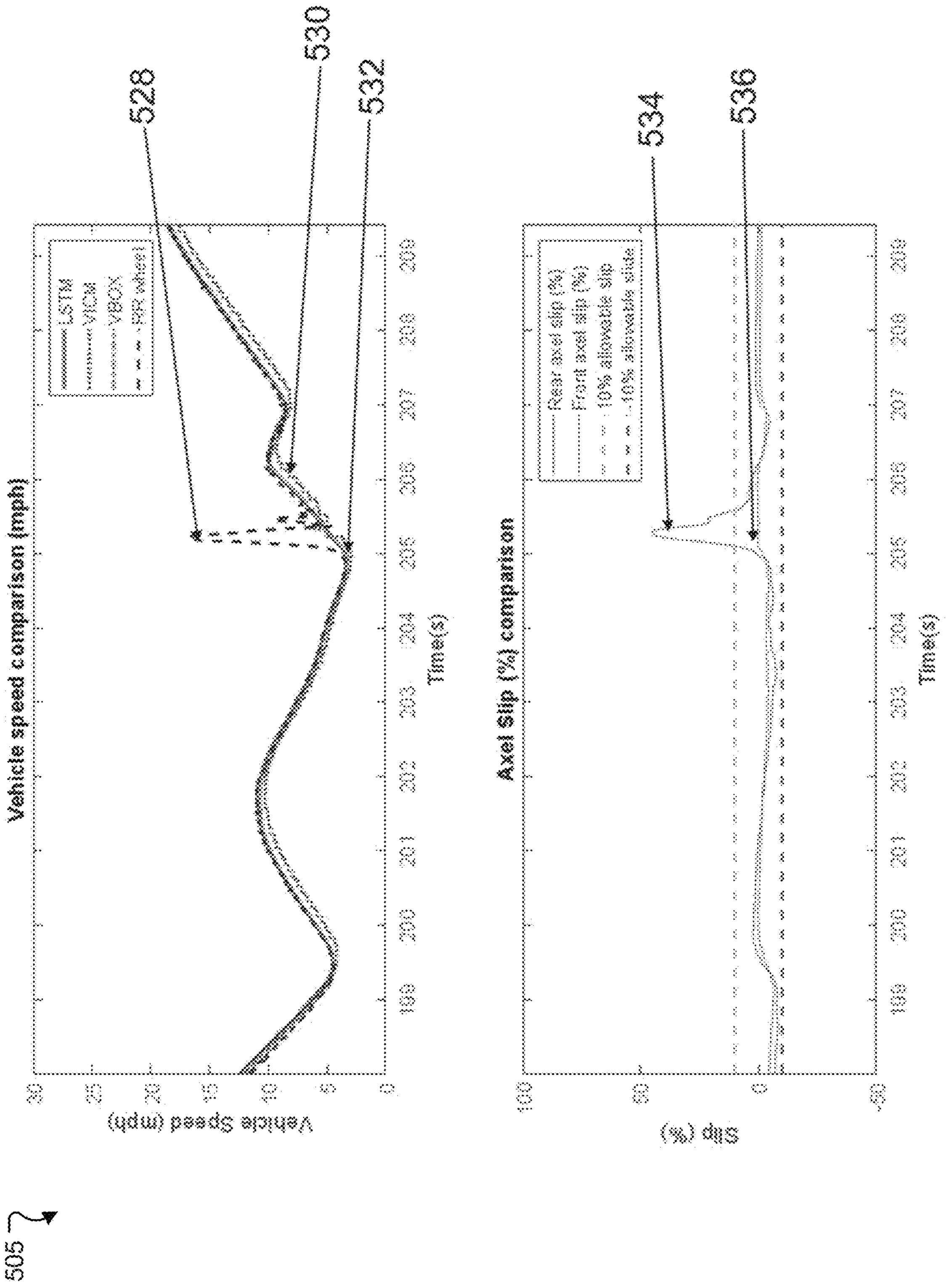

FIG. 5D illustrates a results chart 505 measured for a real-wheel drive vehicle on a road having a pothole, with the inputs and outputs being provided from real-time data. As shown in FIG. 5D, a line 528 shows that, when encountering the pothole, the rear right wheel experiences a flare up, causing, as shown by a line 530, a previous speed prediction technique (based on VICM) to show erratic and incorrect disturbances in vehicle speed. However, a line 532 represents the speed values obtained using the LSTM model based approach of this disclosure, which provides closer to true vehicle speeds, and without the incorrect disturbances. Further, as shown by a line 534 in FIG. 5D, using the LSTM model outputs, it can be determined that the rear axle is detected as slipping (i.e., the rear wheel is overspinning in the pot hole) and, as shown by a line 536, a front axle is correctly detected as unaffected by the pothole.

Figure 6:
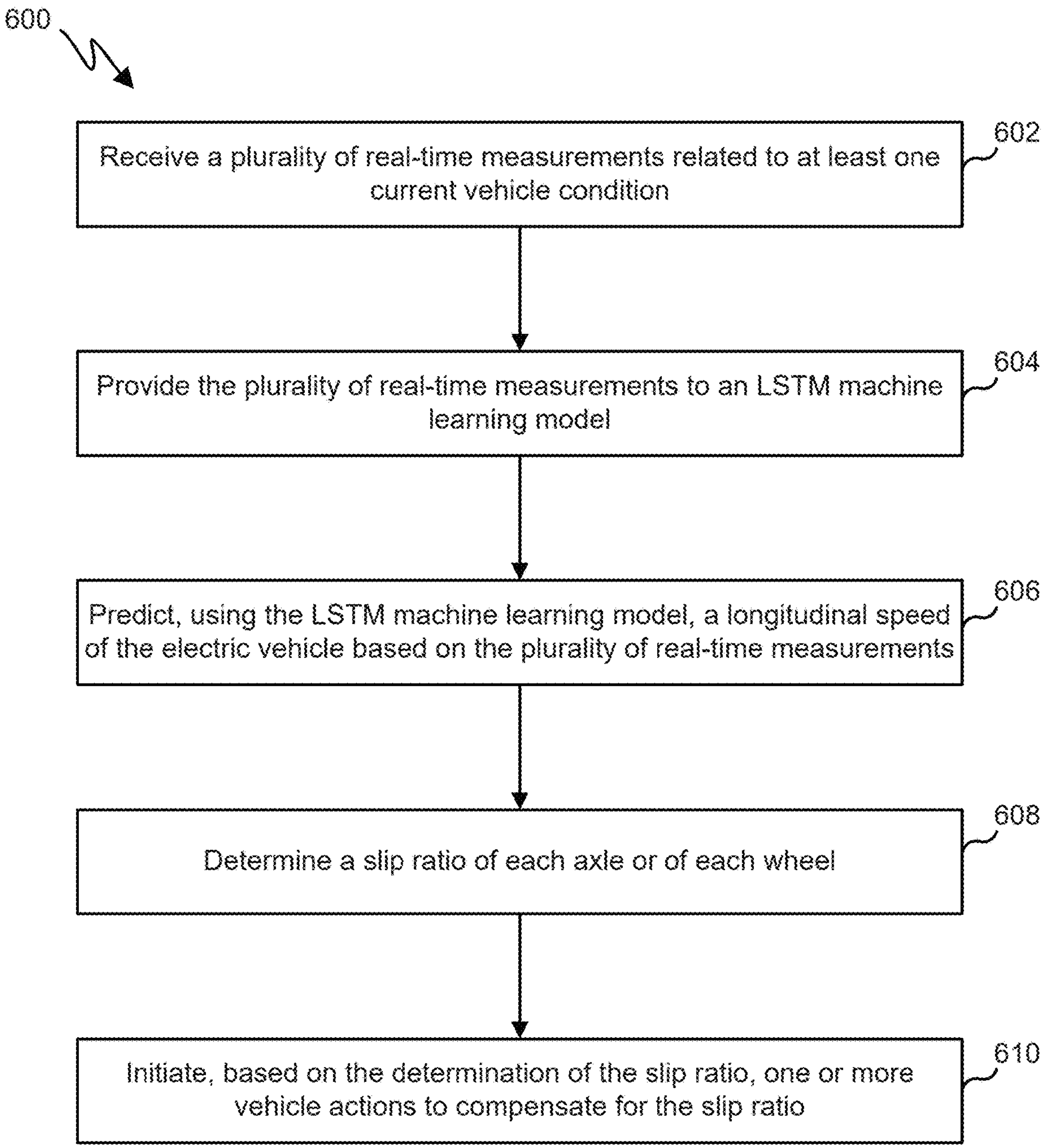
FIG. 6 illustrates an example method for LSTM network based longitudinal vehicle speed prediction for slip detection in accordance with this disclosure.

FIG. 6 illustrates an example method 600 for long short-term memory neural network based longitudinal vehicle speed prediction for slip detection in accordance with this disclosure. For ease of explanation, the method 600 shown in FIG. 6 is described as being performed using one or more of the vehicle 100, the architecture 200, and/or the architecture 300. In various embodiments, certain steps of the method 600 may be described as being performed by a processing device or processor, such as the ECU 202. However, the method 600 could be performed using any other suitable device(s) and in any other suitable system(s).

At step 602, a plurality of real-time measurements is received related to at least one current vehicle condition. This can include the processor or processing device receiving sensor measurements from vehicle sensors such as the sensors 204, 206, or 208 shown and described with respect to FIG. 2. As described in this disclosure, the plurality of real-time measurements can include one or more of a torque measurement of at least one motor of the vehicle, a longitudinal acceleration of the vehicle, a front axle speed of a front axle of the vehicle, or a rear axle speed of a rear axle of the vehicle. In various embodiments, the front axle speed and the rear axle speed can be determined as 0.5× a sum of front wheel speeds and rear wheel speeds, respectively.

At step 604, the plurality of real-time measurements is provided to a long short-term memory (LSTM) machine learning model, which can be an LSTM model having the architecture 300 shown in FIG. 3A. In various embodiments, the LSTM machine learning model can include at least one LSTM cell, and the at least one LSTM cell can include a forget gate, an input gate, an update gate, and an output gate. In various embodiments, the update gate can linearly create new cell candidate values via a linear activation function. In various embodiments, the processing device can be configured to update a cell state of the LSTM cell using the new cell candidate values, linearly output the updated cell state via another linear activation function, and combine, via a sigmoid function, the output updated cell state with an output of the output gate.

In various embodiments, the LSTM machine learning model can be trained using a linear regression loss function and based on ground truth vehicle speeds provided by a vehicle speed sensor to adjust various weights and biases of the LSTM machine learning model. In various embodiments, the LSTM machine learning model can be further trained using training data related to a plurality of traction surfaces.

At step 606, using the LSTM machine learning model, a longitudinal speed of the vehicle is predicted based on the plurality of real-time measurements. At step 608, a longitudinal slip ratio of each axle or of each wheel is determined using the predicted longitudinal speed. In various embodiments, the slip ratio can be determined for each axle based on the predicted longitudinal speed of the vehicle provided by the LSTM machine learning model, the front axle speed, and the rear axle speed. At step 610, based on the determination of the slip ratio, one or more vehicle actions can be initiated to compensate for the slip ratio. In various embodiments, the one or more vehicle actions can include a torque control action or a brake control action.

Although FIG. 6 illustrates one example of a method 600 for long short-term memory neural network based longitudinal vehicle speed prediction for slip detection, various changes may be made to FIG. 6. For example, while shown as a series of steps, various steps in FIG. 6 could overlap, occur in parallel, occur in a different order, or occur any number of times (including zero times).

Various embodiments of this disclosure use a multivariate LSTM without linear or no activation functions that takes 4 inputs from the vehicle's sensors to output the vehicle's longitudinal speed. The 4 inputs can be front axle speed, rear axle speed, torque, and longitudinal acceleration. The speeds can be measured directly from the axles or as an average of wheels of those axles. It will be understood that this disclosure is not limited to EVs only, nor specific powertrain configurations such as AWD, RWD, FWD, 4WD, hybrids (P-HEVs), etc. The predicted vehicle speed is useful to detect wheel or vehicle slip when the vehicle is in low traction surfaces, hence improving brake and traction controls.

Many functional aspects of the present invention can be embodied as software instructions running on a unitary or multi-core central processing unit. Alternatively, functional aspects can manifest as Application Specific Integrated Circuits (ASICs). The ASIC manifestation may use integrated circuit design and manufacturing techniques commonly automated with Electronic Design Automation (EDA) tools. Exemplary but not exclusive tools may be found from companies such as, but not limited to, Synopsys, Cadence, and Mentor Graphics. The details of these EDA tools are not required for the present disclosure.

Figure 7:
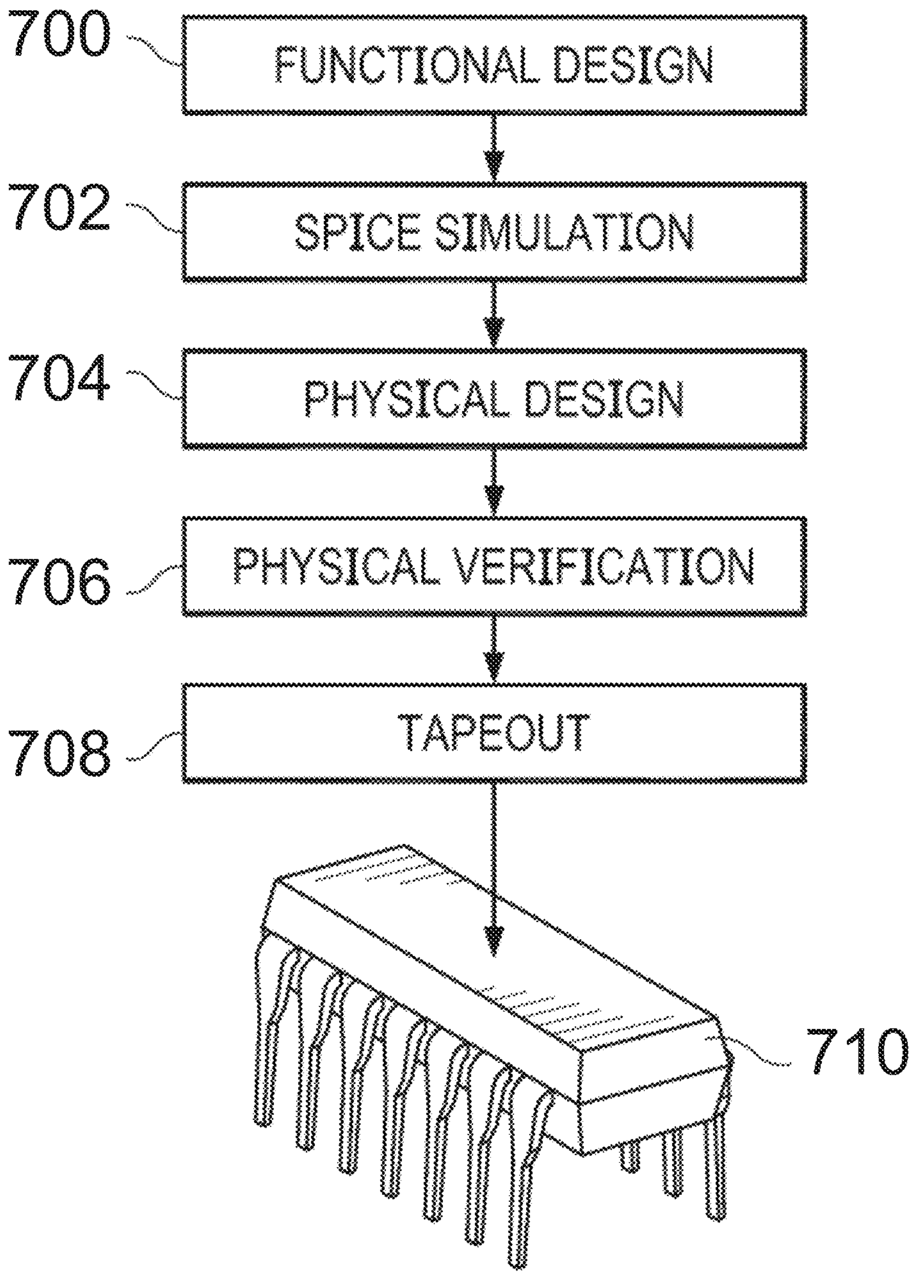
FIG. 7 illustrates a simplified general ASIC design flow employing tools for producing ASICs in accordance with this disclosure.

Reference is now made to FIG. 7 illustrating a simplified general ASIC design flow employing (EDA) tools for producing ASICs having embodiments of the present disclosure. At step 700, the functional design of an ASIC, which may include at least a portion of the methods 400 and/or 600, is created. For those portions of the ASIC digital in nature, the functional design is typically manifested by writing Register Transfer Level (RTL) code in a Hardware Descriptive Language (HDL) such as but not limited to, VHDL or Verilog. A functional verification (behavioral simulation) is then preferably performed on the HDL data structures to ensure the RTL design is in accordance with the logic specifications. Alternatively, a schematic of the digital logic can be captured with a schematic capture program.

For portions of the ASIC that are analog in nature, the analog functional design is typically manifested by capturing a schematic with a schematic capture program. The output of the schematic capture program is then converted (synthesized) into gate/transistor level netlist data structures.

At step 702, the data structures are simulated with a simulation program with integrated circuits emphasis (SPICE). At step 704, the data structures from step 702 are instantiated with their geometric representations and the physical layout of the ASIC is performed.

The first step in physical layout is typically so-called "floor-planning" wherein gross regions on the integrated circuit chip are assigned and input/output (I/O) pins are defined. Hard cores (e.g., arrays, analog blocks, inductors, etc.) are placed within the gross regions based on the design constraints (e.g., trace lengths, timing etc.). Clock wiring (commonly referred to as clock trees) are placed and connections between gates/analog blocks are routed. When all the elements are placed, a global and detailed routing is running to connect all the elements together. Post-wiring optimization is preferably performed to improve performance (timing closure), noise (signal integrity), and yield. The layout is modified, where possible, while maintaining compliance with the design rules set by the captive or external semiconductor manufacturing foundry of choice, to make it more efficient to produce. Such modifications may include adding extra vias or dummy metal/diffusion/poly layers.

At step 706, the physical design is verified. Design rule checking (DRC) is performed to determine whether the physical layout of the ASIC satisfies a series of recommended parameters, i.e., design rules of the foundry. The design rules are a series of parameters provided by the foundry that are specific to a particular semiconductor manufacturing process. The design rules specify certain geometric and connectivity restrictions to ensure sufficient margins to account for variability in semiconductor manufacturing processes, to ensure that the ASICs work correctly. A layout versus schematic (LVS) check is preferably performed to verify the physical layout corresponds to the original schematic or circuit diagram of the design. A complete simulation is then preferably performed to ensure the layout phase is properly done.

After the layout is verified in step 706, mask generation design data, typically in the form of graphic design system II (GDSII) data structures, is said to "tape-out" for preparation of photomasks at step 708. The GDSII data structures are transferred through a communications medium (e.g., storage or over a network) from the circuit designer to either a photomask supplier/maker or directly to the semiconductor foundry.

At step 710, the photomasks are created and used to manufacture ASICs in accordance with principles of the present disclosure.

Some of the techniques described herein can be implemented by software stored on one or more computer readable storage medium and executed on a computer. The selected techniques could be executed on a single computer or a computer networked with another computer or computers. For clarity, only those aspects of the tools or computer germane to the disclosed techniques are described. Product details well known in the art may be omitted.

Figure 8:
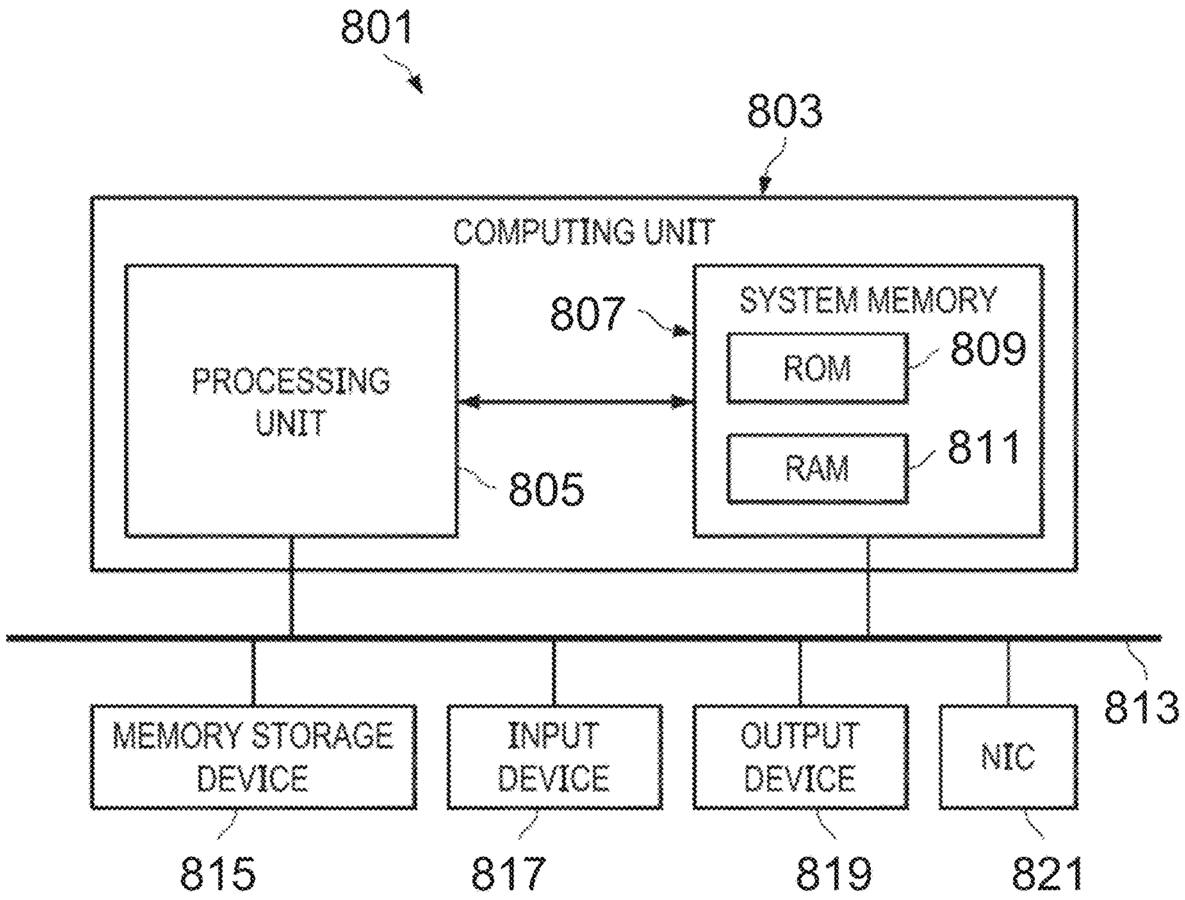
FIG. 8 illustrates an example computing device in accordance with this disclosure.

FIG. 8 illustrates an example computing device 801 for practicing the design flow of FIG. 7. As seen in FIG. 8, the computing device 801 includes a computing unit 803 with a processing unit 805 and a system memory 807. In various embodiments, the system memory 807 can store the LSTM model of this disclosure. The processing unit 805 may be any type of programmable electronic device for executing software instructions, but will conventionally be a microprocessor. In some embodiments, the processing unit 805 can be, include, or execute the ECU 202. The system memory 807 may include both a read-only memory (ROM) 809 and a random access memory (RAM) 811. As will be appreciated by those of ordinary skill in the art, both the read-only memory 809 and the random access memory 811 may store software instructions for execution by the processing unit 805.

The processing unit 805 and the system memory 807 are connected, either directly or indirectly, through a bus 813 or alternate communication structure, to one or more peripheral devices. For example, the processing unit 805 or the system memory 807 may be directly or indirectly connected to one or more additional memory storage devices 815. The memory storage devices 815 may include, for example, a "hard" magnetic disk drive, a solid state disk drive, an optical disk drive, and a removable disk drive. The processing unit 805 and the system memory 807 also may be directly or indirectly connected to one or more input devices 817 and one or more output devices 819. The input devices 817 may include, for example, a keyboard, a pointing device (such as a mouse, touchpad, stylus, trackball, or joystick), a scanner, a camera, touchscreen, and a microphone. The output devices 819 may include, for example, a display device, a printer, and speakers. With various examples of the computing device 801, one or more of the peripheral devices 815-819 may be internally housed with the computing unit 803. Alternately, one or more of the peripheral devices 815-819 may be external to the housing for the computing unit 803 and connected to the bus 813 through, for example, a Universal Serial Bus (USB) connection or a digital visual interface (DVI) connection.

With some implementations, the computing unit 803 may also be directly or indirectly connected to one or more network interfaces cards (NIC) 821, for communicating with other devices making up a network. The network interface cards 821 translate data and control signals from the computing unit 803 into network messages according to one or more communication protocols, such as the transmission control protocol (TCP) and the Internet protocol (IP). Also, the network interface cards 821 may employ any suitable connection agent (or combination of agents) for connecting to a network, including, for example, a wireless transceiver, a modem, or an Ethernet connection.

It should be appreciated that the computing device 801 is illustrated as an example only, and it not intended to be limiting. Various embodiments of the invention may be implemented using one or more computing devices that include the components of the computing device 801 illustrated in FIG. 8, or which include an alternate combination of components, including components that are not shown in FIG. 8. For example, various embodiments of the invention may be implemented using a multi-processor computer, a plurality of single and/or multiprocessor computers arranged into a network, or some combination of both.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:

receiving, by a processing device of a vehicle, a plurality of real-time measurements related to at least one current vehicle condition;

providing, by the processing device, the plurality of real-time measurements to a long short-term memory (LSTM) machine learning model;

determining, by the processing device and using the LSTM machine learning model, a longitudinal speed of the vehicle based on the plurality of real-time measurements;

determining, by the processing device, a longitudinal slip ratio of each axle or of each wheel based on the longitudinal speed; and controlling, based on the determination of the longitudinal slip ratio, one or more vehicle actions to compensate for the longitudinal slip ratio.

2. The method of claim 1, wherein the plurality of real-time measurements includes one or more of:

a torque measurement of at least one motor of the vehicle;

a longitudinal acceleration of the vehicle;

a front axle speed of a front axle of the vehicle; or a rear axle speed of a rear axle of the vehicle.

3. The method of claim 2, wherein the longitudinal slip ratio is determined for each axle based on the longitudinal speed of the vehicle provided by the LSTM machine learning model, the front axle speed, and the rear axle speed.

4. The method of claim 2, wherein the front axle speed and the rear axle speed are determined as 0.5× a sum of front wheel speeds and rear wheel speeds, respectively.

5. The method of claim 1, wherein the LSTM machine learning model includes at least one LSTM cell.

6. The method of claim 5, wherein the at least one LSTM cell includes:

a forget gate;

an input gate;

an update gate; and an output gate, wherein the update gate linearly creates new cell candidate values via a linear activation function.

7. The method of claim 6, further comprising:

updating, by the processing device, a cell state of the LSTM cell using the new cell candidate values;

linearly outputting, by the processing device, the updated cell state via another linear activation function; and combining, via a sigmoid function, the output updated cell state with an output of the output gate.

8. The method of claim 1, wherein the one or more vehicle actions includes a torque control action or a brake control action.

9. The method of claim 1, wherein the LSTM machine learning model is trained using a linear regression loss function and based on ground truth vehicle speeds provided by a vehicle speed sensor to adjust various weights and biases of the LSTM machine learning model.

10. The method of claim 9, wherein the LSTM machine learning model is further trained using training data related to a plurality of traction surfaces.

11. An electric vehicle, comprising:

one or more vehicle component sensors;

a memory storing a long short-term memory (LSTM) machine learning model; and a processing device communicatively connected to the memory and the one or more vehicle component sensors, wherein the processing device is configured to:

receive a plurality of real-time measurements related to at least one current vehicle condition;

provide the plurality of real-time measurements to the LSTM machine learning model;

determine, using the LSTM machine learning model, a longitudinal speed of the electric vehicle based on the plurality of real-time measurements;

determine a longitudinal slip ratio of each axle or of each wheel based on the longitudinal speed; and controlling, based on the determination of the longitudinal slip ratio, one or more vehicle actions to compensate for the longitudinal slip ratio.

12. The electric vehicle of claim 11, wherein the plurality of real-time measurements includes one or more of:

a torque measurement of at least one motor of the electric vehicle;

a longitudinal acceleration of the electric vehicle;

a front axle speed of a front axle of the electric vehicle; or a rear axle speed of a rear axle of the electric vehicle.

13. The electric vehicle of claim 12, wherein the longitudinal slip ratio is determined for each axle based on the longitudinal speed of the electric vehicle provided by the LSTM machine learning model, the front axle speed, and the rear axle speed.

14. The electric vehicle of claim 12, wherein the front axle speed and the rear axle speed are determined as 0.5× a sum of front wheel speeds and rear wheel speeds, respectively.

15. The electric vehicle of claim 11, wherein the LSTM machine learning model includes at least one LSTM cell.

16. The electric vehicle of claim 15, wherein the at least one LSTM cell includes:

a forget gate;

an input gate;

an update gate; and an output gate, wherein the update gate linearly creates new cell candidate values via a linear activation function.

17. The electric vehicle of claim 16, wherein the processing device is further configured to:

update a cell state of the LSTM cell using the new cell candidate values;

linearly output the updated cell state via another linear activation function; and combine, via a sigmoid function, the output updated cell state with an output of the output gate.

18. The electric vehicle of claim 11, wherein the one or more vehicle actions includes a torque control action or a brake control action.

19. The electric vehicle of claim 11, wherein the LSTM machine learning model is trained using a linear regression loss function and based on ground truth vehicle speeds provided by a vehicle speed sensor to adjust various weights and biases of the LSTM machine learning model.

20. The electric vehicle of claim 19, wherein the LSTM machine learning model is further trained using training data related to a plurality of traction surfaces.

* * * * *